United States Patent
Okamoto et al.

(10) Patent No.: US 6,948,179 B2
(45) Date of Patent: Sep. 20, 2005

(54) DISK CARTRIDGE

(75) Inventors: Tomomi Okamoto, Yokohama (JP); Kyuichirou Nagai, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/310,332

(22) Filed: Dec. 4, 2002

(65) Prior Publication Data

US 2003/0128654 A1 Jul. 10, 2003

(30) Foreign Application Priority Data

Dec. 4, 2001 (JP) ........................................ 2001-369452

(51) Int. Cl.⁷ .............................................. G11B 23/03
(52) U.S. Cl. ...................................... 720/725; 369/291
(58) Field of Search ................................ 720/718, 719, 720/725; 369/291

(56) References Cited

U.S. PATENT DOCUMENTS

| | | | |
|---|---|---|---|
| 5,402,882 A | 4/1995 | Bandy et al. | |
| 5,798,888 A | 8/1998 | Fahey et al. | |
| 6,078,563 A * | 6/2000 | Goto et al. | 369/291 |
| 6,274,844 B1 * | 8/2001 | Beuch et al. | 219/121.64 |
| 6,366,553 B1 * | 4/2002 | Takahashi | 369/291 |
| 6,407,982 B1 | 6/2002 | Aoki et al. | |
| 6,414,928 B1 | 7/2002 | Aoki et al. | |
| 6,418,113 B1 * | 7/2002 | Ikebe et al. | 369/291 |
| 6,717,907 B2 * | 4/2004 | Shiomi et al. | 369/291 |
| 2004/0013082 A1 * | 1/2004 | Hayashi | 369/291 |

FOREIGN PATENT DOCUMENTS

| | | | |
|---|---|---|---|
| CN | 1200191 | 11/1998 | |
| JP | 02130772 A * | 5/1990 | ........... G11B/23/03 |
| JP | 08-509936 A | 10/1996 | |
| JP | 10-269740 | 10/1998 | |
| JP | 2001-519073 A | 10/2001 | |

* cited by examiner

Primary Examiner—A. J. Heinz
Assistant Examiner—Mark Blouin
(74) Attorney, Agent, or Firm—Townsend and Townsend and Crew LLP

(57) ABSTRACT

A disk cartridge is provided in which if the width of the disk cartridge is W1 and the outside diameter of the disk is D1, then W1 is about the same as D1. Inside the disk cartridge is a disk space in which the disk can rotate. A movement restricting portion restricts movement of the disk in the direction parallel with a disk surface. A cutout that extends through into the disk space is provided in part of a surface forming the width of the disk cartridge. A protrusion is provided in the surface adjacent to the surface in which the cutout is provided and at a position near the cutout.

1 Claim, 8 Drawing Sheets

DISK CARTRIDGE

BACKGROUND OF THE INVENTION

1. Field of the Invention

The present invention relates to a disk cartridge for use in a disk-shaped recording medium, which intends to make the disk cartridge even more compact.

2. Description of the Related Art

An optical disk is an example of the disk-shaped recording medium. In many cases, the optical disk is used, being contained inside a disk cartridge to prevent a recording surface of the disk from being contaminated with grease or dirt on fingers and to enhance ease of handling. To ensure that the optical disk can be properly contained in the disk cartridge, therefore, the width of the disk cartridge is made larger than the outside diameter of the disk in conventional disk cartridges. Japanese Patent Laid-open No. Hei 10-269740 discloses an example of the disk cartridge of this type.

The prior art commonly found in conventional disk cartridges will be explained with reference to FIGS. 9 through 11. FIG. 9 is a perspective view of a conventional disk cartridge 101. FIG. 10 is a view showing the disk cartridge in relation to a disk housed in the disk cartridge. FIG. 11 is an exploded view of the disk cartridge 101. The disk cartridge 101 includes two cases or a case 102a and a case 102b, which are larger than the outside diameter of a disk 105, a shutter 103, a shutter spring 104, and a write-protect block 109. Each of the case 102a and the case 102b is shaped so as to form a disk space 111 in which the disk can be contained, when the cases 102a and 102b are mated with each other. In addition, a disk movement restricting portion 112 that restricts the movement of the disk 105 in the direction parallel with a disk surface on an outer periphery of the disk space 111. The fact that the disk 105 is located within the disk space 111 allows the disk 105 to be rotated without coming into contact with the case 102a or case 102b. Furthermore, the case 102a is mated with the case 102b so as to house the disk 105 therebetween. This allows a major part of the entire disk 105 to be isolated from the outside of the cartridge.

An opening window 110a and an opening window 110b are provided in the case 102a and the case 102b, respectively. The shutter 103 is used to open or close these opening windows 110a, 110b. In recording and reproducing apparatus, an optical head accesses the disk 105 through these opening windows 110a, 110b to record or reproduce information on the disk. The shutter spring 104 urges the shutter 103 in a direction to close the opening windows 110a, 110b at all times. It is designed to close the opening windows 110a, 110b whenever the disk cartridge 101 is located outside the recording and reproducing apparatus. As is known from the foregoing description, the cases 102a, 102b and the shutter 103 are designed to isolate the disk 105 from the outside when the disk is outside the recording and reproducing apparatus. The write-protect block 109 is a switch that selects either to enable or disable recording the disk 105. The user himself or herself actually operates the switch to prevent information recorded on the disk from being inadvertently erased.

The conventional disk cartridge is configured such that its width is wider than the outside diameter of the disk. It should be ensured that the disk 105 rotates in the disk space 111 inside the disk cartridge 101 without coming into contact with any part thereof. To make sure of that, it is necessary to take into consideration radial runout or the like that occurs when an eccentric disk rotates as well as the outside diameter of the disk 105, when disposing the disk movement restricting portion 112 provided on the outer periphery of the disk space 111. As shown in FIG. 10, therefore, the following relationship holds true between a width W2 of the disk cartridge 101 and an outside diameter D2 of the disk 105:

$$W2 > D2.$$

In addition, side walls should be provided along edges of the disk space 111 in order to isolate the disk 105 from the outside completely. It is possible to let the disk movement restricting portion 112 function also as the side walls. Referring to FIG. 11, if the shortest distance between a rotation axis of the disk 105 and the disk movement restricting portion 112 is R2, the following relationship holds true between the width W2 of the disk cartridge 101 and the distance R2 between the rotation axis and the disk space edge, since the thickness of the disk movement restricting portion 112 is added to the width of the disk cartridge 101:

$$W2 > 2 \times R2.$$

To use the disk cartridge, therefore, the cartridge must be larger than the disk. If the disk cartridge is larger than the disk, it becomes difficult to make a disk apparatus that uses the disk cartridge more compact.

SUMMARY OF THE INVENTION

The object of the present invention is to provide an even more compact disk cartridge while maintaining a required level of reliability and ease of use.

Reliability in recording/reproducing technology has been remarkably enhanced as a result of the reduced number of data writing errors thanks to adaptive recording control or the like that responds to the varying conditions on the surface of the disk and the reduced number of repeated reproduction of a single data location or data recognition errors thanks to strengthened error correcting processing. Thanks to this improved recording/reproducing technology, it has become possible to prevent recording/reproducing performance from being degraded due to dust and dirt sticking to the surface of the disk, as long as the disk is stored and used in an ordinary manner. It is nonetheless still difficult, even with this improved recording/reproducing technology, to prevent recording/reproducing performance from being degraded as caused by oil and grease on fingers contaminating the recording portion. Main typical causes of contamination with oil and grease include handling by the user if, for example, a disk cartridge is not used for the disk. He or she may unconsciously or inadvertently touch to contaminate the recording portion of the disk. If the disk cartridge is used, on the other hand, the user will have no chance to touch the disk, thus substantially effectively preventing the disk from being contaminated.

Taking these aspects into consideration, the present invention is intended to make the disk cartridge even more compact than the conventional ones with special emphasis placed on prevention of contamination of the disk recording surface with oil and grease and downsizing of the disk cartridge.

The present invention is realized by employing the following means.

If the width of the disk cartridge is W1 and the outside diameter of the disk is D1, then the following relationship is made to hold true:

$W1 \approx D1$.

There is provided inside the disk cartridge a disk space, in which the disk can rotate. A disk movement restricting portion that restricts the movement of the disk in the direction parallel with a disk surface is provided on an outer periphery of the disk space. Assuming that the shortest distance between a rotation axis about which the disk rotates in the disk cartridge and the disk movement restricting portion is R1, the following relationship is made to hold true:

$$W1 \leq 2 \times R1$$

In addition, a cutout that extends through into the disk space is provided in part of a surface forming the width of the disk cartridge.

A protrusion is provided in the surface adjacent to the surface in which the cutout is provided and near the cutout.

The disk cartridge according to the aforementioned construction makes it possible to realize one having a width substantially equal to the outside diameter of the disk, which is effective in making an even more compact disk cartridge.

DETAILED DESCRIPTION OF THE PREFERRED EMBODIMENTS

The preferred embodiments according to the present invention will be described in the following with reference to FIGS. 1 through 8.

Figure 1:
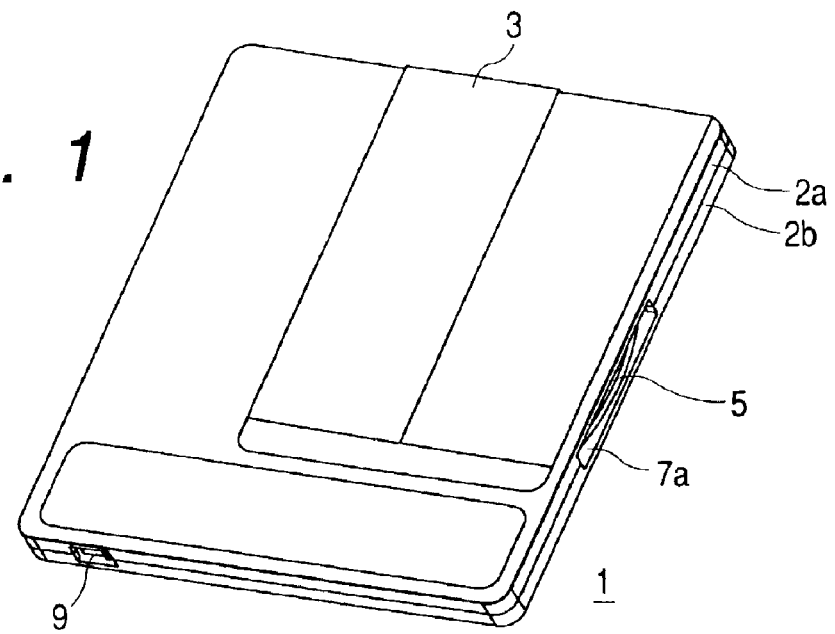
FIG. 1 is a perspective view of a disk cartridge according to a first embodiment of the present invention.
Figure 2:
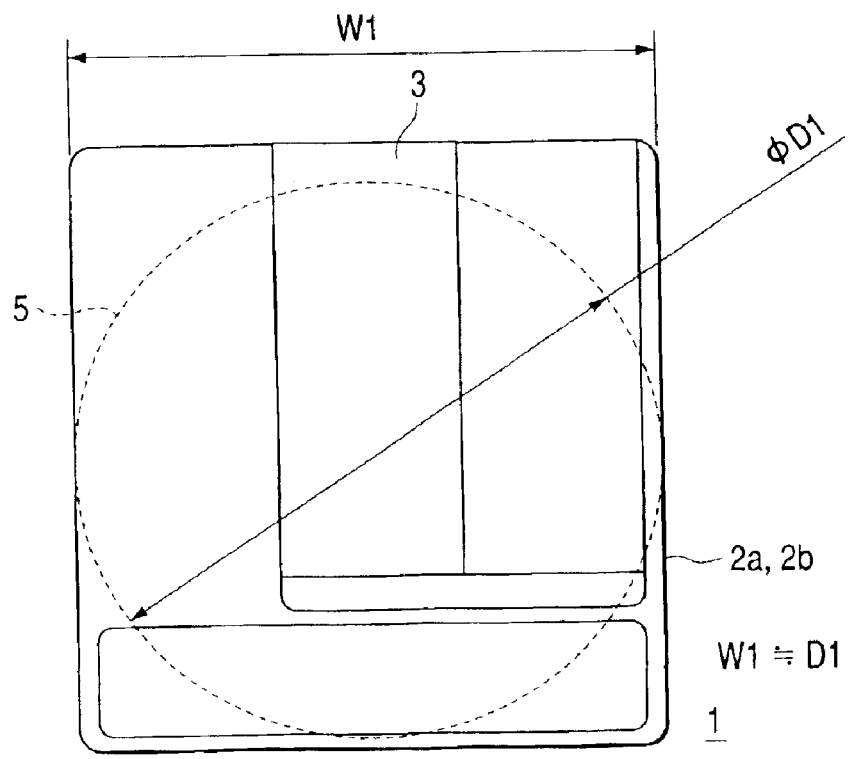
FIG. 2 is a diagram showing the disk cartridge in relation to a disk housed in the disk cartridge according to the first embodiment of the present invention.
Figure 3:
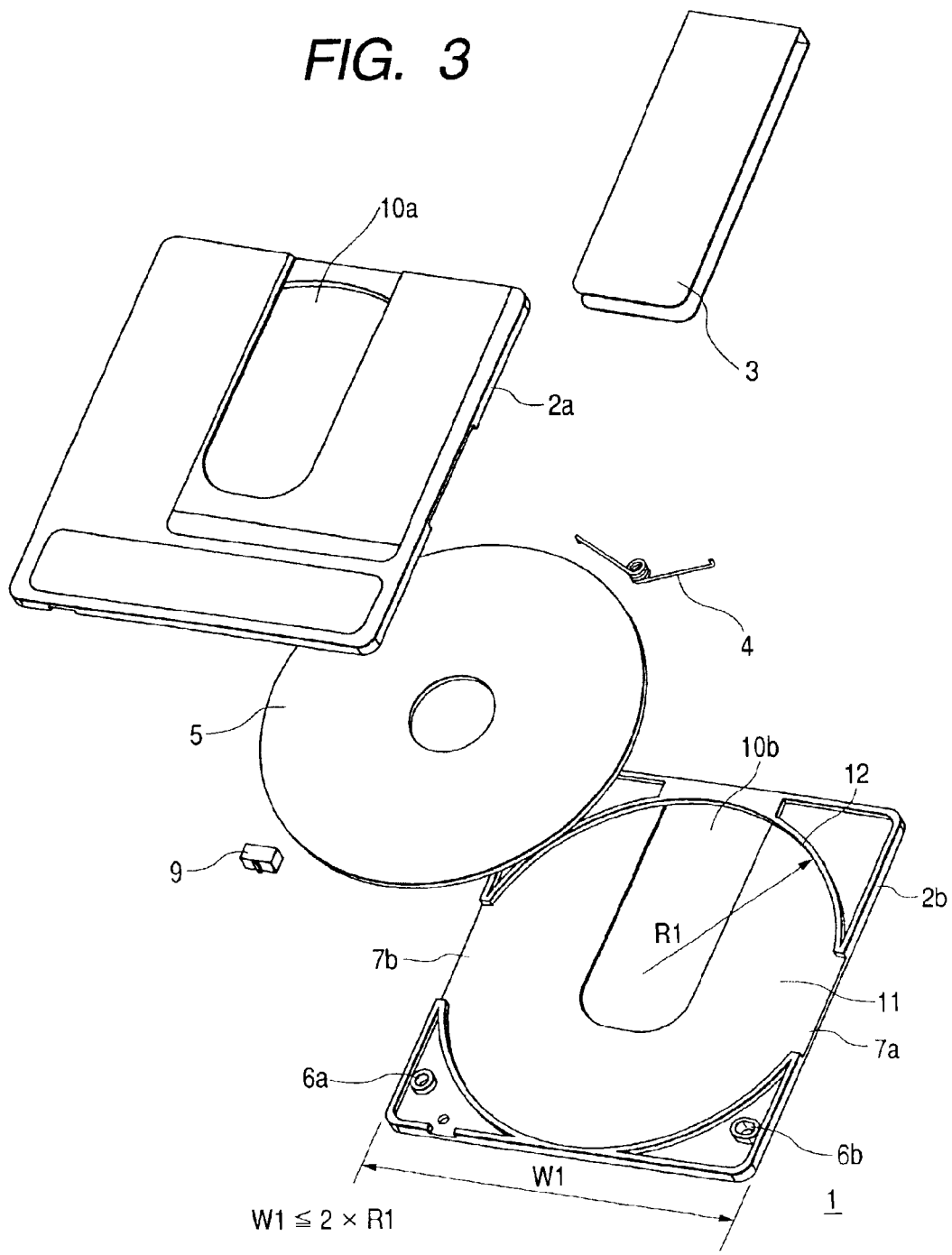
FIG. 3 is an exploded view of the disk cartridge according to the first embodiment of the present invention.

FIGS. 1 through 3 are schematic views showing a disk cartridge according to a first embodiment of the present invention. FIG. 1 is a perspective view of the disk cartridge. FIG. 2 is a diagram showing the disk cartridge in relation to a disk housed in the disk cartridge. FIG. 3 is an exploded view of the disk cartridge.

A disk cartridge 1 includes two cases or a case 2a and a case 2b, a shutter 3, a shutter spring 4, and a write-protect block 9. Each of the case 2a and the case 2b is shaped so as to form a disk space 11 in which the disk can be contained, when the cases 2a and 2b are mated with each other. In addition, a disk movement restricting portion 12 is provided which restricts the movement of the disk 5 in the direction parallel with a disk surface on the outer periphery of the disk space 11. The fact that the disk 5 is located within the disk space 11 allows the disk 5 to be rotated without coming into contact with the case 2a or case 2b. Furthermore, the case 2a is mated with the case 2b so as to house therebetween the disk 5. This allows a good part of the entire disk 5 to be isolated from the outside of the cartridge. An opening window 10a and an opening window 10b are provided in the case 2a and the case 2b, respectively. The shutter 3 is used to open or close these opening windows 10a, 10b. In recording and reproducing apparatus, an optical head accesses the disk 5 through these opening windows 10a, 10b to record or reproduce information on the disk. The shutter spring 4 urges the shutter in a direction to close the opening windows 10a, 10b at all times. It is designed to close the opening windows 10a, 10b whenever the disk cartridge 1 is located outside the recording and reproducing apparatus. As is known from the foregoing description, the cases 2a, 2b and the shutter 3 are designed to isolate the disk 5 from the outside when the disk is outside the recording and reproducing apparatus. The write-protect block 9 is a switch that selects either to enable or disable recording the disk 5. The user himself or herself actually operates the switch to prevent information recorded on the disk from being inadvertently erased.

In the disk cartridge according to the first embodiment of the present invention, cutouts 7a, 7b are provided in their respective sides of the disk cartridge 1. As shown in FIG. 2, this makes a width W1 of the disk cartridge 1 substantially equal to an outside diameter D1 of the disk 5. Providing the cutouts 7a, 7b results in the disk 5 being exposed from the disk cartridge 1; however, the exposed portion of the disk 5 is only the outer periphery thereof, which eliminates the possibility of a recording surface of the disk being contaminated with fingerprints or the like. Even if part of the disk 5 is exposed from the cutouts provided in part of the disk cartridge 1, there is no chance of the user's touching the recording surface in actual handling. This presents substantially no serious problems.

Referring to FIG. 3, assume that the shortest distance between a disk rotation axis and the disk movement restricting portion 12 provided on the outer periphery in the disk space 11 is R1. Then, providing the cutouts 7a, 7b in the respective sides of the disk cartridge 1 makes a width W1 of the disk cartridge satisfy the following relationship, that is:

$$W1 \leq 2 \times R1.$$

This makes it possible to make the disk cartridge even more compact.

As evident from the foregoing description, providing the cutouts 7a, 7b in the respective sides of the disk cartridge 1 makes the width of the disk cartridge, which has conventionally been larger than the disk, the size comparable to that of the disk according to the first embodiment of the present invention. This is advantageous to providing an even more compact disk cartridge.

According to the first embodiment of the present invention, it is considered that rigidity in the disk cartridge is reduced due to the cutouts provided in the respective sides of the disk cartridge.

A disk cartridge according to a second embodiment of the present invention, in which reduction in rigidity is prevented, will be explained with reference to FIGS. 4(a) and 4(b), and 5(a) and 5(b), together with the direction, in which the rigidity in the disk cartridge is reduced.

Figure 4A:
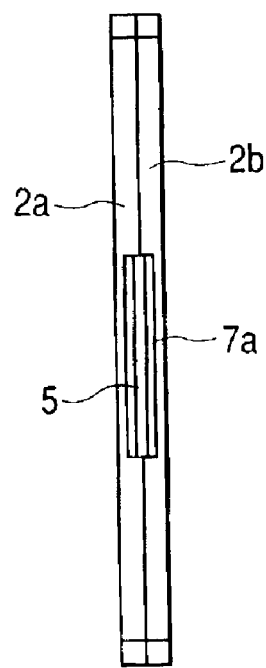
FIG. 4(a) is a side view of the disk cartridge of a second embodiment, as viewed from a side in which cutouts are provided.
Figure 4B:
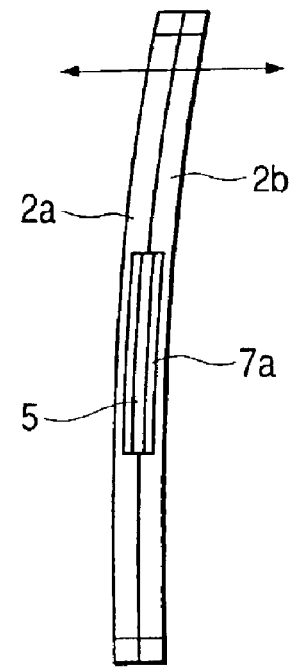
FIG. 4(b) is a side view of the disk cartridge of FIG. 4(a), showing the direction in which rigidity of the disk cartridge is reduced.
Figure 5A:
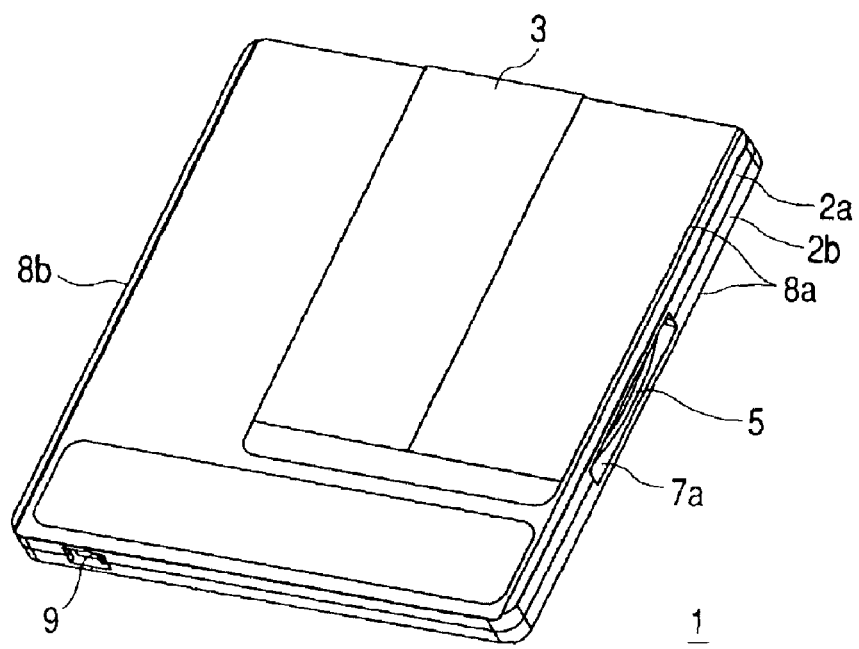
FIG. 5(a) is a perspective view of a disk cartridge according to the second embodiment of the present invention with rigidity enhanced by providing protrusions therein.
Figure 5B:
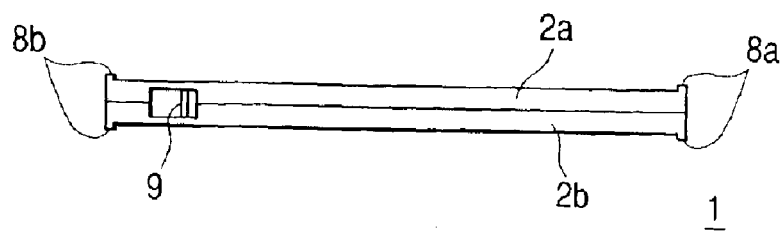
FIG. 5(b) is a bottom view of the disk cartridge of FIG. 5(a)

FIG. 4 includes views each showing a side of the disk cartridge according to the embodiment of the present invention, in which the cutouts are provided. If the cutouts are provided in part of the sides as shown in FIG. 4(a), the rigidity in the direction shown by the arrow in FIG. 4(b) is reduced, which could cause the disk cartridge to be deformed as shown in FIG. 4(b). To prevent this, it would be effective to provide protrusions 8a, 8b, as shown in FIGS. 5(a) and 5(b), in sides adjacent to those in which the cutouts are provided and at positions near the cutouts. FIG. 5(a) is a perspective view of a disk cartridge provided with protrusions 8a, 8b. FIG. 5(b) shows the disk cartridge 1 as viewed from the bottom thereof. Providing these protrusions 8a, 8b increases rigidity in the direction shown in FIG. 4(b), thus effectively preventing the disk cartridge 1 from being deformed.

Figure 6:
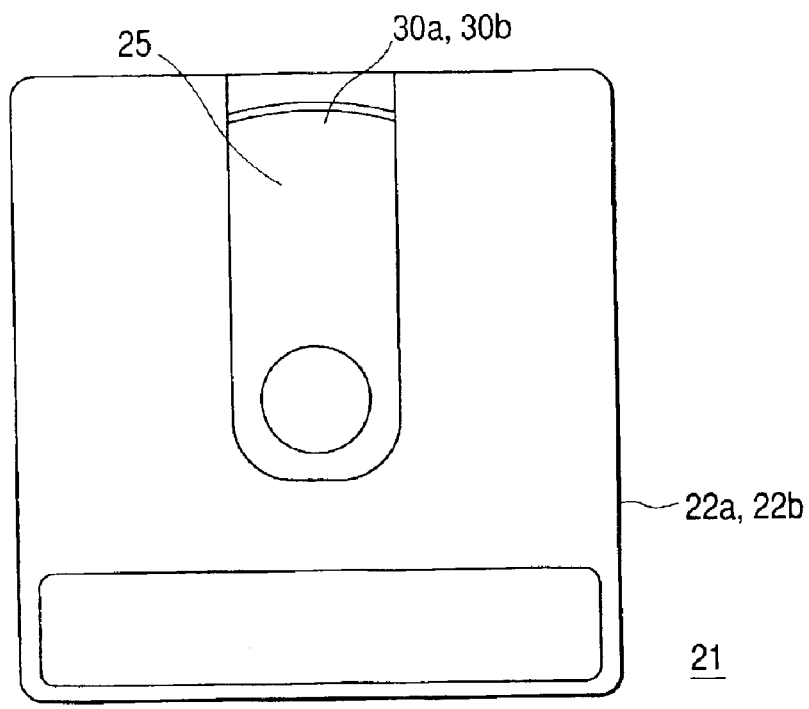
FIG. 6 is a plan view of a disk cartridge according to a third embodiment of the present invention.

A disk cartridge according to a third embodiment of the present invention will be explained with reference to FIG. 6. Referring to FIG. 6, a disk cartridge 21 has the same construction as that of the first embodiment except for the elimination of the shutter. A disk 25 is exposed at all times through an opening window 30a. Eliminating the shutter results in the number of parts used being decreased, which makes for a lower cost. When the disk is handled without using any disk cartridge, the user can touch only limited areas, such as an outer periphery and a hole in the center of the disk, when handling it with care not to contaminate the recording surface thereof with fingerprints. The disk cartridge having no shutters like this one according to the third embodiment of the present invention, on the other hand, provides a greater area of handling than in the disk without any disk cartridge. That is, although the recording surface of the disk is exposed through the opening window, other portions are covered with cases 22a, 22b. This enhances ease of handling. The width of the disk cartridge 21 can also be made to equal to that of the disk without any disk cartridge, thanks to the preferred embodiments of the present invention.

Figure 7:
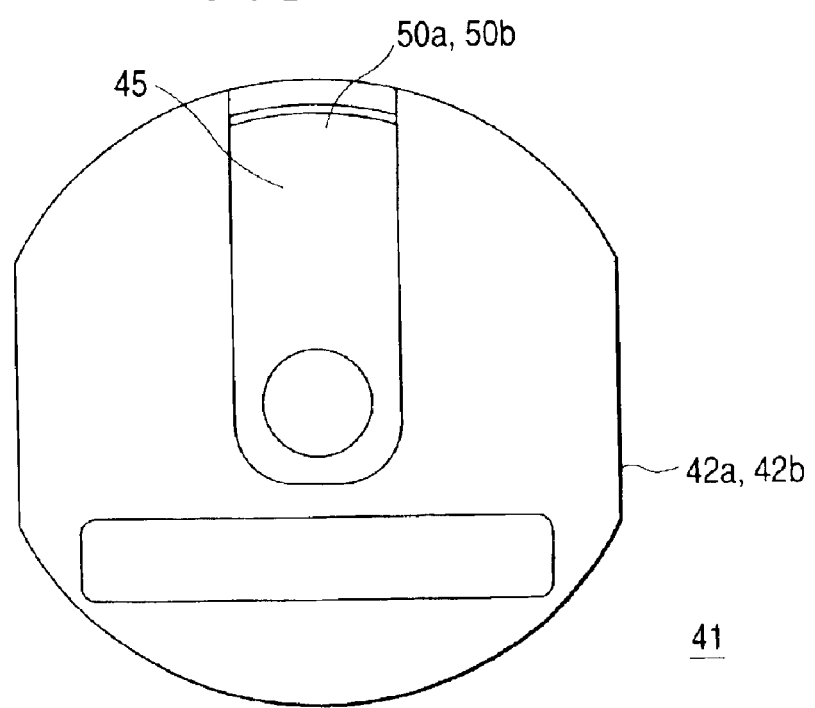
FIG. 7 is a plan view of a disk cartridge according to a fourth embodiment of the present invention.

A disk cartridge according to a fourth embodiment of the present invention will be explained with reference to FIG. 7. A disk cartridge 41 shown in FIG. 7 is the disk cartridge according to the third embodiment of the present invention, the corners of which are rounded off into arcs. Disk cartridges are commonly of a rectangular shape; however, since the disk is of an arc, the corners of the disk cartridge contribute to a larger cartridge body. According to the fourth embodiment, therefore, the corners of the disk cartridge 41 have been eliminated and formed into arcs, thus making for an even more compact body.

Figure 8A:
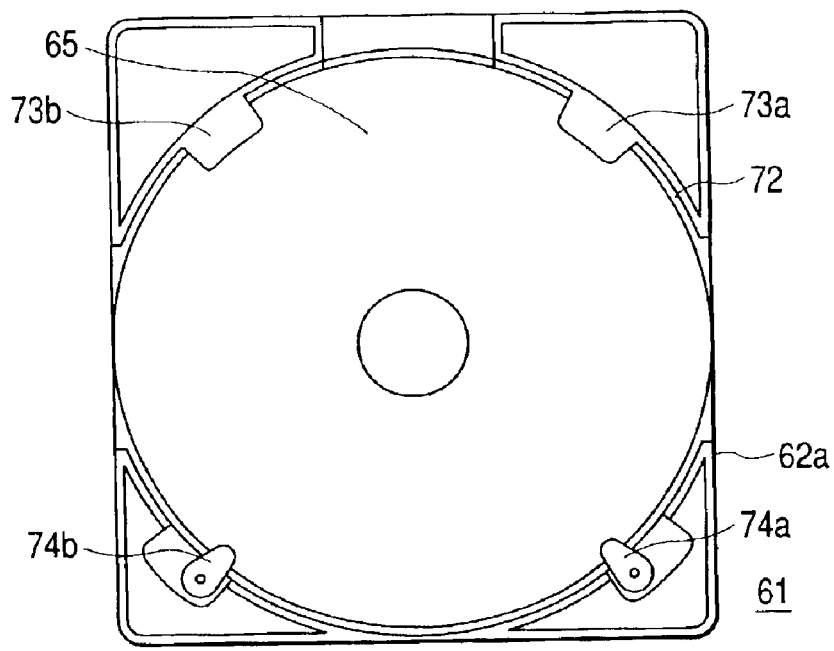
FIG. 8(a) is a plan view of a disk cartridge according to a fifth embodiment of the present invention, showing the upper side thereof.
Figure 8B:
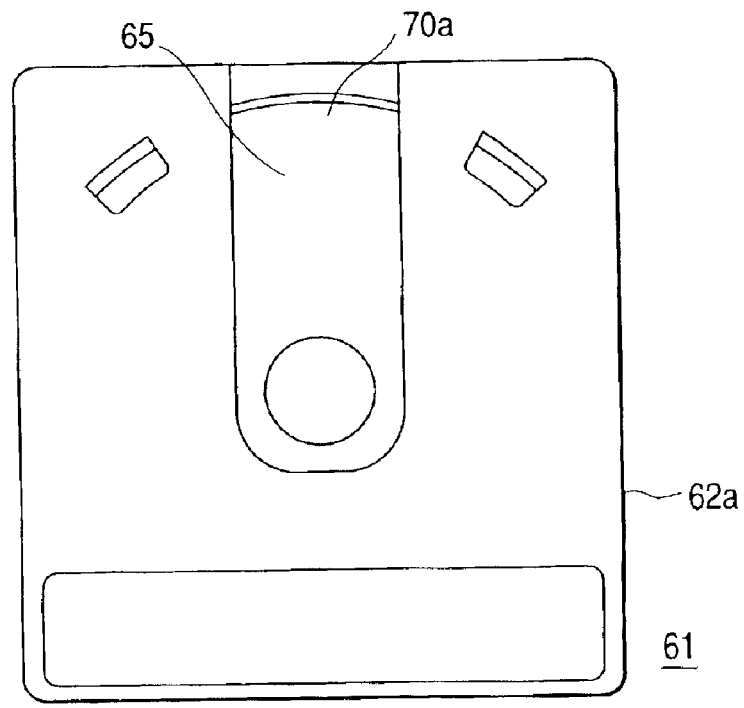
FIG. 8(b) is the disk cartridge of the fifth embodiment, showing the lower side thereof.
Figure 9:
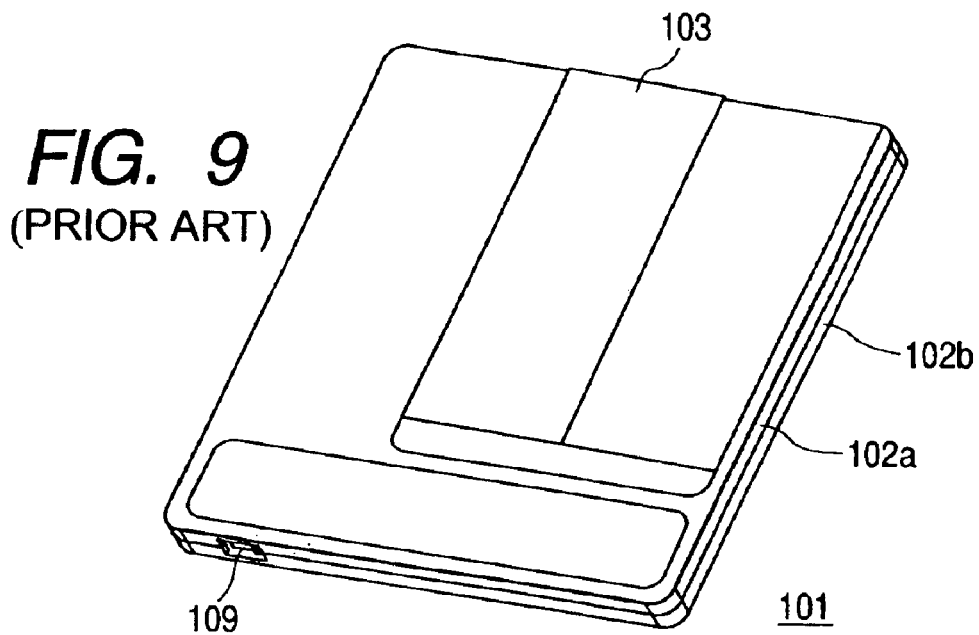
FIG. 9 is a perspective view of a conventional disk cartridge.
Figure 10:
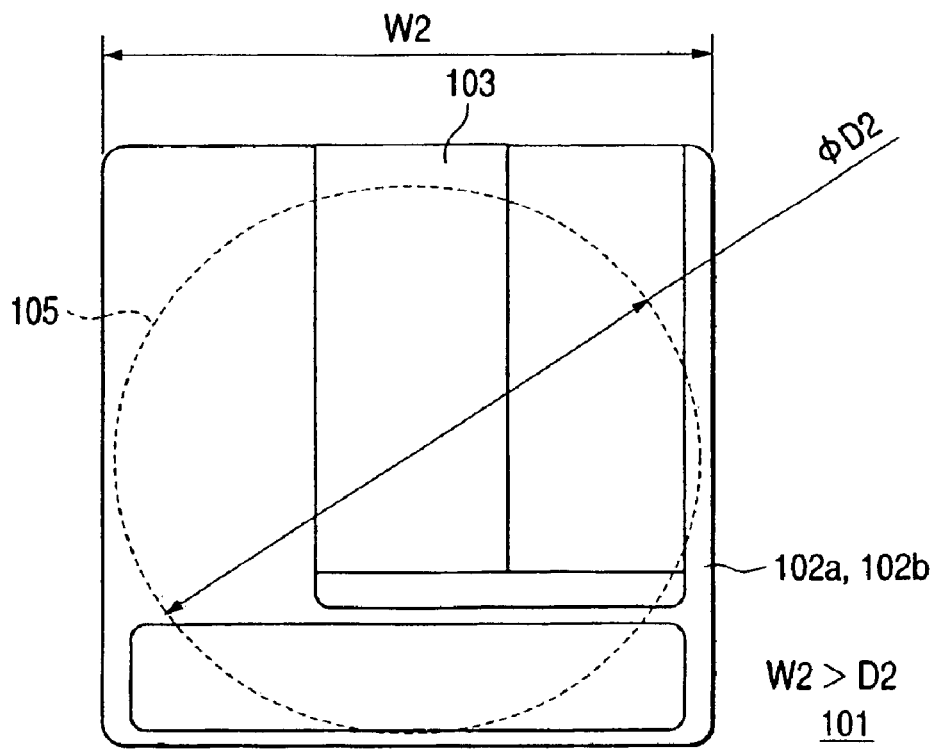
FIG. 10 is a diagram showing the conventional disk cartridge in relation to a conventional disk housed in the disk cartridge.
Figure 11:
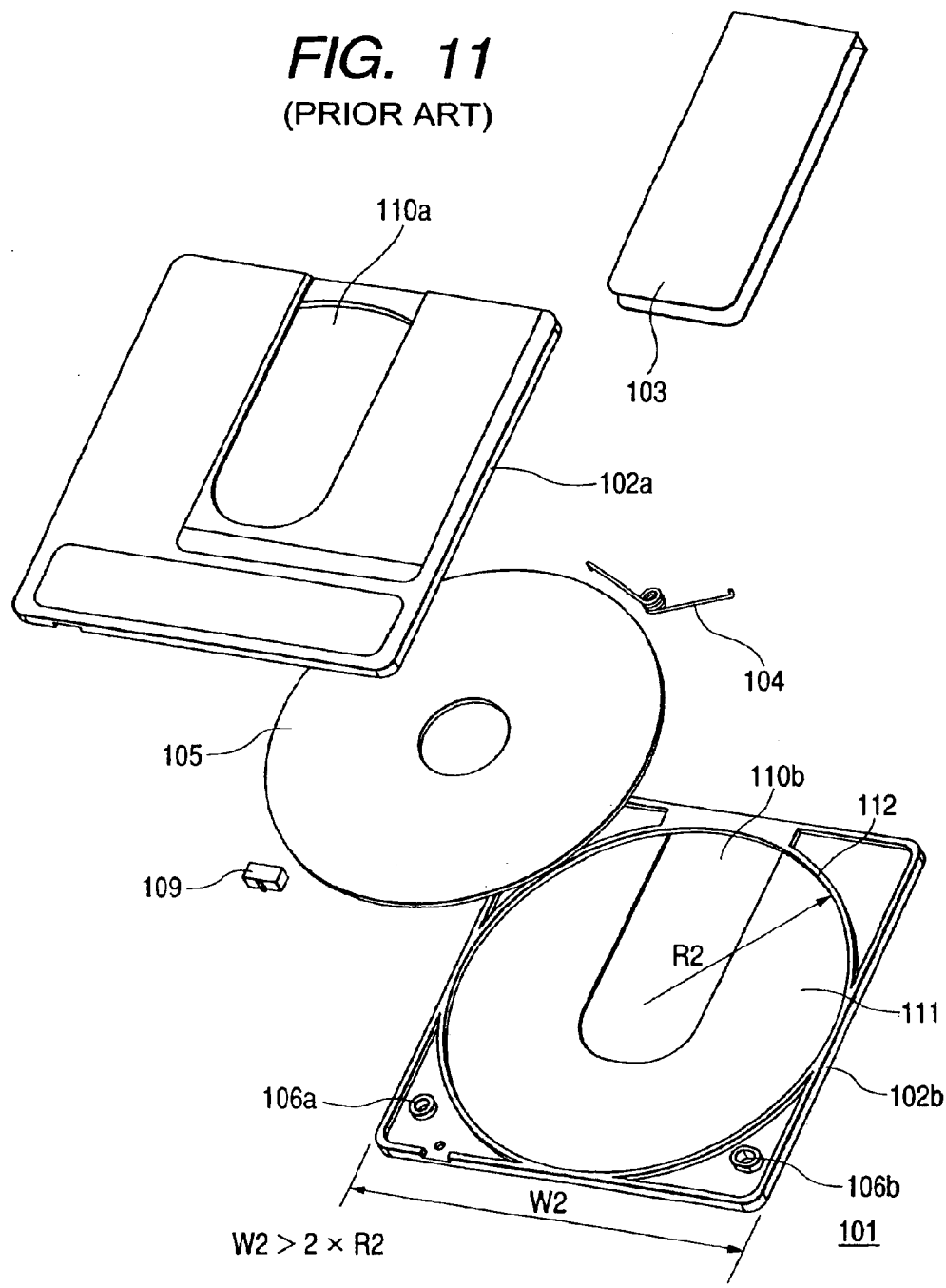
FIG. 11 is an exploded view of the conventional disk cartridge.

A disk cartridge according to a fifth embodiment of the present invention will be explained with reference to FIGS. 8(a) and 8(b). FIGS. 8(a) and 8(b) show the front side and back side, respectively, of a disk cartridge 61. Referring to FIGS. 8(a) and 8(b), the disk cartridge 61 represents the disk cartridge according to the first embodiment, from which the shutter is eliminated and a case 62a is disposed on one side only in relation to a disk 65. The case 62a is provided with flanges 73a, 73b and movable flanges 74a, 74b to hold the disk 65 in position. The disk 65 has a recording surface on one side thereof only. The side exposed through an opening 70a is the recording surface. Since the disk is single-sided, the fact that the non-recording surface is being exposed as shown in FIG. 8(a) presents no problems. The disk cartridge according to the fifth embodiment of the present invention is provided with only one case that forms the cartridge, which makes for a lower cost. The disk cartridge can be made even more compact by applying the preferred embodiments of the present invention.

What is claimed is:

1. A disk cartridge provided with a disk-shaped recording medium, wherein, the disk cartridge is configured with a disk space therein in which the recording medium can rotate;

a disk-movement-restricting portion is integrally formed in the disk cartridge, defines a periphery of the disk space, and is configured to restrict movement of the recording medium in a direction parallel with a surface of the recording medium; and if: i) a width of the disk cartridge is W1,
  ii) an outside diameter of the recording medium is D1, and
  iii) the shortest distance between a rotation axis around which the recording medium rotates in the disk cartridge and the disk movement restricting portion is R1, then the following relationship is made to hold true:

$$2 \times R1 > W1 \geq D1; \text{ and}$$

an aperture formed on a side of the disk cartridge extends into the disk space.

* * * * *